United States Patent [19]

Marion

[11] 4,189,307
[45] Feb. 19, 1980

[54] PRODUCTION OF CLEAN HCN-FREE SYNTHESIS GAS

[75] Inventor: Charles P. Marion, Mamaroneck, N.Y.

[73] Assignee: Texaco Development Corporation, White Plains, N.Y.

[21] Appl. No.: 919,091

[22] Filed: Jun. 26, 1978

[51] Int. Cl.² ............................................. C10K 1/10
[52] U.S. Cl. ................................. 48/197 R; 48/206; 55/68; 252/373; 423/236
[58] Field of Search .............. 48/197 R, 202, 206, 48/215; 423/236; 55/68; 252/373; 261/114 R

[56] References Cited

U.S. PATENT DOCUMENTS

| | | | |
|---|---|---|---|
| 1,971,779 | 8/1934 | Gollmar | 423/236 |
| 2,088,003 | 7/1937 | Sperr, Jr. | 423/236 |
| 2,143,821 | 1/1939 | Sperr, Jr. | 423/236 |
| 2,989,147 | 6/1961 | Gollmar | 55/68 |
| 3,848,057 | 11/1974 | Leder et al. | 423/236 |
| 3,866,411 | 2/1975 | Marion et al. | 48/215 |
| 3,878,289 | 4/1975 | Beavon | 423/236 |
| 3,887,682 | 6/1975 | Kumata et al. | 423/236 |
| 3,935,188 | 1/1976 | Karwat | 423/236 |
| 3,950,492 | 4/1976 | Haese | 423/236 |
| 4,088,735 | 5/1978 | Bratzler et al. | 55/68 |

FOREIGN PATENT DOCUMENTS 2531721  5/1976  Fed. Rep. of Germany .......... 423/236

Primary Examiner—S. Leon Bashore
Assistant Examiner—George C. Yeung
Attorney, Agent, or Firm—Robert A. Kulason; Carl G. Ries; Albert Brent

[57] ABSTRACT

Clean HCN-free synthesis gas is produced from raw synthesis gas leaving a partial-oxidation gas generator by a continuous process comprising the steps of partial cooling, scrubbing with condensate, cooling below the dew point by indirect heat exchange preferably with a rich liquid absorbent from a downstream acid-gas-removal zone, and scrubbing with cold aqueous absorbent. The rich HCN-containing aqueous absorbent is then safely processed, without polluting the environment. For example, the HCN-containing aqueous absorbent may be stripped or reacted in the gas generator. Optionally, other acid gases, if present, may be removed from the synthesis gas in said acid-gas-removal zone.

13 Claims, 1 Drawing Figure

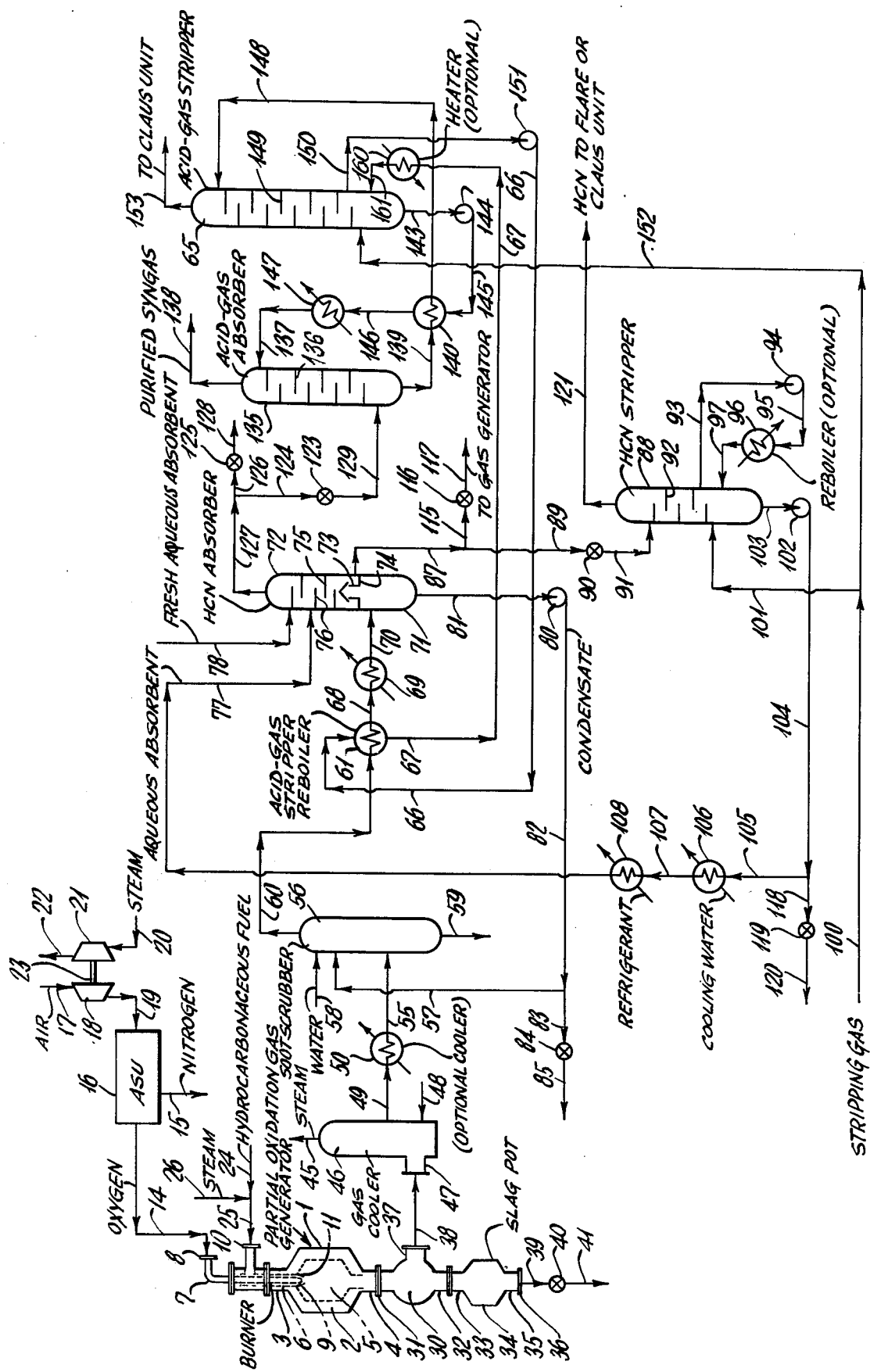

PRODUCTION OF CLEAN HCN-FREE SYNTHESIS GAS

BACKGROUND OF THE INVENTION

1. Field of the Invention

This invention relates to a continuous partial oxidation process for the production of a stream of clean synthesis gas that is substantially free from HCN. If present, other acid-gases may be separately removed.

2. Description of the Prior Art

Trace amounts of HCN i.e. 0.5 to 100 parts per million (PPM) by weight in the synthesis gas are sufficient to deactivate the catalysts employed in subsequent processes, such as in processes for oxo or oxyl synthesis. Also, HCN in the gas stream may corrode steel piping and vessels. Further, the life of some liquid organic absorbents that are employed in conventional downstream acid-gas removal systems may be shortened by the presence of HCN impurities in the gas stream. HCN may be removed from synthesis gas when the gas stream is subjected to the catalytic water gas shift reaction. However, this step will change the $H_2/CO$ mole ratio of the gas stream and, produce unwanted nitrogen oxides and ammonia. Advantageously, by the subject process, substantially all of the HCN is removed from synthesis gas without changing the $H_2/CO$ of the mole ratio of the product gas. Further, the HCN is disposed of without polluting the environment.

SUMMARY

This is a continuous partial oxidation process for producing clean synthesis gas that is substantially free from HCN. The amount of HCN in the product gas will have been reduced to less than 0.3 parts per million. In the process, raw synthesis gas i.e., gaseous mixtures comprising $H_2+CO$, containing about 0.5 to 100 PPM of HCN is produced by the partial oxidation of hydrocarbonaceous fuel in a free-flow non-catalytic gas generator. The raw gas stream is partially cooled and is then cleaned by being scrubbed with at least a portion of the condensate obtained by cooling the gas stream leaving the scrubbing zone below the dew point in a gas cooling zone. In one embodiment, the hydrocarbonaceous fuel contains sulfur impurities and acid-gases from the group $H_2S$, COS and $CO_2$ which are removed downstream in an acid-gas purification zone. In such case, the rich liquid organic absorbent from the acid-gas purification operation may be heated and regenerated by indirect heat exchange with the clean gas stream in said gas cooling zone. Each million Standard Cubic Feet (SCF) of clean synthesis gas is then contacted with about 200 to 500 gallons (gals.) say 250–350 gals. of cold aqueous absorbent i.e. water, in liquid phase in an absorption column at a temperature in the range of about 35° to 120° F., preferably below 100° F., say 50° to 95° F., and a pressure in the range of about 5 to 3000 psia, preferably at least 100 psia, say 100 to 1000 psia. A clean stream of synthesis gas, substantially free from HCN, is removed from the top of the absorption column, and is optionally subjected to further purification in an acid-gas purification operation to remove any acid gases that may be present, as previously mentioned. The HCN-rich aqueous absorbent may be regenerated by heating, stripping, or both in a stripping column. The overhead gas stream from the HCN-stripping column may be recycled to the gas generator or introduced into a sulfur-recovery operation, or discharged to flare. Alternatively, at least a portion of the HCN-rich aqueous absorbent may be introduced into the gas generator in liquid or vapor phase. By the subject process, environmental pollution is avoided.

BRIEF DESCRIPTION OF THE DRAWING

The invention will be further understood by reference to the accompanying drawing. The drawing is a preferred embodiment of the process for producing a clean stream of synthesis gas containing substantially no HCN. Further, there is depicted the separate removal of at least one gaseous impurity from the group $H_2S$, COS, and $CO_2$, when present in the stream of raw synthesis gas.

DESCRIPTION OF THE INVENTION

The present invention pertains to an improved continuous partial oxidation process for producing a stream of synthesis gas that is substantially free from HCN. By definition, the term "substantially free" means from 0 to 0.3 Parts Per Million (PPM) (by weight dry basis). By means of the subject process, the lives of the catalysts that are contacted by the improved HCN-free synthesis gas may be extended at a great economic benefit. For example, in one catalytic oxo-synthesis operation, it was estimated that a savings of 7 million dollars a year in catalyst costs alone could be effected by removing the trace amounts of HCN from the synthesis gas feed stream.

Removal of $H_2S$ and COS when present, by optional additional steps, is also beneficial for extending the life of sulfur-sensitive catalysts.

Optional steps are provided for removing acid gases such as $H_2S$, COS and $CO_2$, if present in the HCN-free synthesis gas. Further, the subject process provides for the safe disposal of the HCN as well as any other acid-gas impurities that are removed by the subject process, without polluting the atmosphere.

In the subject process, a hydrocarbonaceous feed is reacted with a free-oxygen containing gas, optionally with or without a temperature moderator, in the reaction zone of a free-flow noncatalytic synthesis gas generator at a temperature in the range of about 1300° to 3500° F., say about 1800° to 2800° F., and a pressure in the range of about 1 to 250 atmospheres absolute (atm. abs.), say about 10 to 200 atm. abs. or 40 to 100 atm. abs. The reaction time in the gas generator is about 1 to 10 seconds. The effluent stream of raw synthesis gas leaving the gas generator comprises $H_2$, CO, $CO_2$, HCN and at least one material from the group $H_2O$, $H_2S$, COS, $CH_4$, $N_2$, $A_r$, $NH_3$ and entrained particulate solids. The composition of the raw synthesis gas in mole % may be as follows: $H_2$ 10.0 to 68.0, CO 15.0 to 60, $CO_2$ 3.0 to 30.0, $H_2O$ 2.0 to 50.0 $CH_4$ 0 to 28.0, $H_2S$ 0.0 to 5, COS 0.0 to 0.3, $N_2$ 0.0 to 60.0, $A_r$ 0.0 to 1.8, and $NH_3$ 0 to 0.2. HCN is present in the amount of about 0.5 to 100 PPM (weight basis). Unreacted particulate carbon (on the basis of carbon in the feed by weight) is present in the amount of about 0.2 to 20 weight percent with liquid feeds and is usually negligible with gaseous hydrocarbon feeds.

A free-flow synthesis gas generator comprising a vertical cylindrically shaped steel pressure vessel lined with refractory, such as shown in the drawing is used. The gas generator is free from packing or catalyst. The feedstreams are introduced into the reaction zone of the fuel gas generator by means of a fuel burner. Suitably, an annulus-type burner, such as described in coassigned U.S. Pat. No. 2,928,460 issued to duBois Eastman et al, may be employed.

A wide range of combustible carbon containing organic materials may be reacted in the gas generator with a free-oxygen containing gas optionally in the presence of a temperature moderator gas to produce said effluent gas stream.

The term hydrocarbonaceous as used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included with the definition of the term "hydrocarbonaceous." For example, there are (1) pumpable slurries of solid carbonaceous fuels, such as coal, lignite, wood pulp, particulate carbon, petroleum coke, concentrated sewer sludge, and mixtures thereof in a liquid carrier such as water, liquid hydrocarbon, and mixtures thereof; (2) gas-solid suspension such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of 0 to 10 weight percent and an ash content in the range of about 0 to 15 weight percent (wt.%) and up to 50 wt.% with solid hydrocarbonaceous fuels. The nitrogen content of liquid and solid hydrocarbonaceous fuels is in the range of about nil to 3 weight percent. When such fuels are gasified in the partial oxidation gas regenerator, the concentration of HCN in the combustion gases is estimated to be about one part per million for each 0.1 wt.% of combined nitrogen in the hydrocarbonaceous feed. While HCN is primarily produced in the gas generator from reactions that involve the combined nitrogen, some HCN may be produced by reactions in the gas generator which involve any gaseous nitrogen that may be present i.e. nitrogen from air.

The term liquid hydrocarbon, as used herein to describe suitable liquid feedstocks, is intended to include various materials, such as liquefied petroleum gas, petroleum distillates and residues, gasoline, naphtha, kerosene, crude petroleum, asphalt, gas oil, residual oil, tar-sand and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed may be at room temperature or it may be preheated to a temperature up to as high as about 600° F. to 1200° F., say 800° F. but preferably below its cracking temperature. The hydrocarbonaceous feed may be introduced into the burner in liquid phase or in a vaporized mixture with a temperature moderator. Suitable temperature moderators include steam, water, $CO_2$-rich gas, nitrogen in air, by-product nitrogen from a conventional air separation unit, and mixtures of the aforesaid temperature moderators. In one embodiment of the process, a HCN-rich stream of aqueous absorbent is safely disposed of by reacting it in the gas generator as the temperature moderator.

The use of a temperature moderator in the reaction zone of the gas generator depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

The weight ratio of total amount of $H_2O$ to fuel introduced into the reaction zone of the gas generator may be in the range of about 0 to 5. When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or a combination thereof. In such case, the weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases). The amount of nitrogen in the product gas may be decreased by reacting substantially pure oxygen or oxygen-enriched air in the gas generator in place of air. Free-oxygen containing gas may be introduced into the burner at a temperature in the range of about ambient to 1800° F. The ratio of free oxygen in the oxidant to carbon in the feedstock (O/C, atom/atom) is preferably in the range of about 0.7 to 1.5

A continuous stream of hot effluent gas, at substantially the same temperature and pressure as in the reaction zone leaves from the exit port of the gas generator and is then introduced into a conventional gas cooler. A free-flow solids separation zone may be inserted between the exit port of the gas generator and said gas cooler. The solids separation zone may comprise a catch-pot, slag chamber, or some other scheme for removing at least a portion of any solid matter i.e. particulate carbon, ash, metal constituents, scale, slag, refractory, and mixtures thereof that may be entrained in the hot effluent gas stream, or which may flow from the gas generator i.e. slag, ash, bits of refractory. A portion of the solid particles are thereby separated from the effluent gas stream and recovered with very little, if any temperature or pressure drop in the process gas stream. A typical slag chamber that may be employed is shown in the drawing.

By indirect heat exchange in at least one conventional gas cooler, the raw synthesis gas stream from the gas generator or optionally from a solids separation zone directly following the gas generator, is cooled to a temperature in the range of about 300° F. to 900° F., say about 400° F. to 800° F. or about 300° F. to 700° F. For example, boiler feed water or other coolant may be used in one gas cooler, thereby producing steam for use elsewhere in the process, such as in the gas generator. Optionally, additional cooling may be effected in another gas cooler with water or air as the coolant. The normal ordinary pressure drop across the solids separation zone, if any, plus across the gas cooler for the synthesis gas stream is about 5 to 50 pounds per square foot absolute (psia). In other embodiments of the process, cooling of the raw gas stream from the gas generator may be effected by introducing the gas stream directly into a quench tank containing a quench fluid. A suitable quench tank is shown in coassigned U.S. Pat. No. 2,896,927. The quench fluid may be, for example, hot water which leaves said tank at a temperature in the range of about 300° F. to 600° F., and which cools the gas stream to a temperature in the range of about 300° F. to 700° F. Alternately, an organic fluid, such as a liquid hydrocarbonaceous fuel may be used as the quench fluid, in the manner described in coassigned U.S. Pat. No. 4,007,018. In such case, the organic quenching fluid leaves the quench tank at a temperature in the range of about 300° F. to 850° F., and cools the gas stream to a temperature in the range of about 300° F. to 900° F.

The cooled raw synthesis gas stream is then introduced into a conventional gas-liquid scrubbing zone where it is scrubbed with a scrubbing fluid comprising water. Preferably, the scrubbing fluid may comprise condensate, derived from the raw synthesis gas stream, and make-up water if any. The water enters the soot scrubber at a temperature in the range of about ambient to 250° F., such as about ambient to 150° F. say about 80° F. to 150° F. Preferably the pressure in the scrubbing zone is the same as that in the gas generator less ordinary pressure drop in the intervening lines and equipment. Any remaining entrained particulate solids such as carbon soot may be thereby removed. The condensate is obtained by cooling the clean synthesis gas stream leaving the scrubbing zone to a temperature below the dew point. The water that condenses out is then separated from the gas stream. Thus, by passing the process gas stream up a scrubbing column in direct contact and counter-current flow with said condensate scrubbing fluid flowing down the column, any remaining entrained solids may be removed from the gas stream. For example, a slurry of particulate carbon and water may be removed from the bottom of the column at a temperature in the range of about 212° F. to 600° F. and sent to a carbon separation or concentration zone. Carbon recovery may be done by any suitable conventional liquid-solids separation means including filtration, centrifuge, gravity settling, or by liquid hydrocarbon extraction. Clean make-up water may be introduced into the top of the scrubbing column for contacting more synthesis gas. Other suitable conventional gas cooling and cleaning procedures may be used in combination with or in place of the aforesaid scrubbing column. For example, the process gas stream may be introduced below the surface of a pool of quenching and scrubbing fluid comprising condensate which enters the quench tank at a temperature in the range of about ambient to 250° F. by means of a dip-tube unit. Alternately, the process gas stream may be passed through a plurality of scrubbing steps including an orifice-type scrubber or a venturi nozzle scrubber.

The clean synthesis gas leaves the scrubbing zone at a temperature in the range of about 212° F. to 600° F. say about 250° to 540° F. and is passed through a cooling zone where the temperature is further reduced. For example, the synthesis gas is reduced to a temperature in the range of about ambient to 150° F., say about 80° F. to 120° F. The condensate is separated from the gas stream, collected, and at least a portion is recycled to the gas scrubbing zone as previously described. Optionally, before being recycled, the condensates may be degasified or a portion may be introduced into the gas generator. The cooling zone may comprise at least one conventional shell and tube heat exchanger through which the clean gas stream passes in indirect heat exchange. One or more coolants may be employed. Preferably, when the hydrocarbonaceous feed contains sulfur impurities the coolant in the first heat exchanger is preferably the liquid absorbent from the liquid absorbent regenerator in an acid gas removal system located downstream in the process. By this means, the first heat exchanger may serve as a reboiler for said liquid absorbent regenerator, thereby improving the thermal efficiency of the system. Alternatively, a heat exchanger may be employed with cold water or air as the coolant, either alone or in addition to the aforesaid first heat exchanger. For example, the clean gas stream may be cooled to a temperature in the range of about 120° F. to 250° F. in the first heat exchanger, and then cooled to about ambient to 150° F. in the second heat exchanger.

The next step in the process consists of contacting the clean gas stream at a temperature in the range of about ambient to 150° F., say about 80° F. to 120° F., with an aqueous absorbent in liquid phase at a temperature in the range of about 35° to 120° F., and preferably below 100° F. say about 50° to 95° F. in an HCN-absorption zone at a pressure in the range of about 5 to 3000 psia, preferably at least 100 psia, say 100 to 1600 psia. Advantageously, the pressure in the HCN-absorber may be the same pressure as that in the gas generator less ordinary pressure drop in the lines and equipment i.e. a pressure drop of less than 50 psia. By this means expensive gas compressors may be eliminated.

Any conventional gas-liquid contacting apparatus may be employed as the HCN-absorber, including packed or tray-type columns. Suitably, a tray-type absorption column may be employed comprising an upper portion containing a plurality of horizontal trays for HCN absorption in the cold aqueous absorbent, a bottom chimney tray located near the lower end of said column to remove the cool HCN-rich aqueous absorbent, and a bottom portion located below said chimney tray into which the cooled clean gas stream is introduced and in which the condensate is separated from the gas stream and is collected. Fresh HCN-free aqueous absorbent make-up may be introduced into the top of the column in order to give a final clean rinse to the gas stream which leaves the column containing substantially no HCN i.e. less than 0.3 ppm. Cooled recycle aqueous absorbent obtained from a HCN-stripper to be further described, is introduced into the upper portion of the HCN absorption column.

By definition the term "aqueous absorbent" means a liquid phase absorbent containing about 90 to 100 volume % water, and preferably 100% water. Cold water is an excellent scrubbing fluid because of its lower molecular weight, greater density, and lower cost in comparison with organic solvents. Dilute solutions of water and sulfuric acid i.e. up to 10 vol. % $H_2SO_4$ and dilute water solutions i.e. up to saturated solutions of the carbonates, bicarbonates, and mixtures thereof of an element or mixture of elements selected from Group IA elements i.e. Na, K, Li, and mixtures thereof, also fall within the definition of "aqueous absorbent". For example, an aqueous solution in the range of about 1 to 10 weight, say about 2 to 5 wt. % selected from the group sodium carbonate, potassium carbonate, lithium carbonate, and mixtures thereof may be used as the "aqueous absorbent". Dilute sulfuric acid is particularly effective for HCN absorption as it inhibits polymerization of the HCN. Further, the rich-dilute sulfuric acid absorbent may be easily regenerated by physical separating means i.e., boiling, stripping or both. Regeneration of the rich-dilute-alkali absorbent, on the other hand, is effected by chemical treatment to remove the cyanide. For example by heating the rich absorbent to a temperature in the range of about 450° F. to 500° F. for about one hr. under autogenic pressure, sodium or potassium cyanide may be hydrolyzed to ammonia and sodium or potassium formate. The $CO_2$ in synthesis gas reacts with the sodium or potassium formate to produce sodium or potassium carbonate-bicarbonate. Optionally, at least a portion of the rich-dilute-alkali absorbent from the HCN absorber may be introduced into the gas generator.

Each million standard cubic feet (SCF) of clean dewatered synthesis gas is contacted with about 200 to 500 gallons, say 250 to 350 gallons of aqueous absorbent in liquid phase in the HCN absorption column. The HCN-rich aqueous absorbent containing up to about 500 PPM HCN is removed from the bottom chimney tray in the HCN-absorption column. It is then processed in the HCN stripper to remove the dissolved HCN, and then cooled and recycled to the HCN-absorption column to contact additional synthesis gas. Alternatively, at least a portion of the HCN-rich aqueous absorbent may be safely disposed of by being introduced into the gas generator in liquid or vapor phase as at least a portion of the temperature moderator. In the gas generator, or externally thereof, the HCN may be reacted with $H_2O$ to produce trace amounts of CO and $NH_3$.

In the preferred embodiment in which water or a dilute aqueous solution of sulfuric acid is employed as the aqueous absorbent, the regeneration of the HCN-rich aqueous absorbent may be effected by the physical means of a gas stripping operation by which the gaseous HCN is separated from the aqueous absorbent. For example, in a conventional multi-plate stripping column, with or without a reboiler, the HCN-rich aqueous absorbent at a temperature in the range of about 50° F. to 120° F. and at reduced pressure i.e. a pressure in the range of about 1 to 2 atmospheres gauge, is introduced near the top of the column and HCN-free aqueous absorbent is removed from the bottom. Optionally, stripping gas, such as nitrogen or steam may be introduced near the bottom of the HCN-stripper. The gaseous HCN stream leaving near the top of the HCN-stripper may be disposed of by any of the following ways: sent to flare, burned in a furnace or in the gas generator, or sent to a Claus operation. The HCN-free reclaimed aqueous absorbent, containing less than 1.5 parts per million of HCN leaves at the bottom of the HCN-stripper at a temperature in the range of about 150° F. to 300° F. It is then pumped through a cooling zone where the temperature is reduced to about 35° F. to 120° F. Cooling may be effected by indirect heat exchange with a coolant in at least one heat exchanger. For example, the coolant in a first conventional shell and tube heat exchanger may be cold water, and a refrigerant may be the coolant in a second heat exchanger. The cooled HCN-free aqueous absorbent is then recycled to the upper portion of the HCN-absorption tower. Fresh make-up water may be introduced into the top of the HCN absorption tower as a final rinse for the substantially HCN-free gas stream leaving the tower.

When the hydrocarbonaceous fuel to the partial oxidation gas generator contains sulfur compounds, $H_2S$ and COS will also be present in the raw synthesis gas stream leaving the gas generator. In such case, it is desirable to remove these acid-gas impurities from the synthesis gas prior to feeding the gas into a downstream process that may employ a sulfur sensitive catalyst. Accordingly, in this embodiment of the subject process, the HCN-free synthesis gas stream leaving the HCN-absorber as previously described, is introduced into an acid-gas purification zone.

Any suitable conventional purification process may be used to remove at least one acid gas from the group $H_2S$, COS, and $CO_2$ from the HCN-free synthesis gas. For example, refrigeration and/or physical or chemical absorption with a liquid organic solvent may be employed. Typical liquid solvent absorbents include: methanol, n-methylpyrrolidone, triethanolamine, propylene carbonate, or alternately hot potassium carbonate. When necessary, final cleanup may be accomplished by passing the process gas stream through iron oxide, zinc oxide, or activated carbon to remove residual traces of $H_2S$ or organic sulfide. The clean purified HCN-free stream of synthesis gas leaving the acid gas absorber may have the following impurities on a weight basis in parts per million: $H_2S$+COS nil to 0.3; HCN nil to 0.3; and entrained carbon (basis weight of C in hydrocarbonaceous fuel) from about nil to 0.2.

The rich solvent absorbent leaving the acid gas absorber may be regenerated in an acid-gas stripper by heating and flashing. Optionally, a stripping gas such as nitrogen may be also employed. Advantageously, in the subject process the reboiler for the acid gas stripper may be the first shell and tube heat exchanger used to cool the clean synthesis gas stream going into the HCN absorber, as described previously. By this means the thermal efficiency of the process is improved. When nitrogen is used as a stripping gas, it may be obtained from the air separation unit as a low-cost by-product. Substantially pure oxygen may be produced in the same air separation unit and introduced into the gas generator as a free-oxygen containing gas. The overhead gas stream from the acid gas stripper comprising $H_2S$, COS, and $CO_2$ may be safely disposed of, for example, as feed to a sulfur-recovery operation. Suitably, a Claus unit for producing elemental sulfur, as described in Kirk-Othmer Encyclopedia of Chemical Technology, Second Edition Volume 19, John Wiley, 1969, Page 353, may be used. Excess $SO_2$ may be removed and discarded in chemical combination with limestone, or by means of a suitable commercial extraction process.

DESCRIPTION OF THE DRAWING

A more complete understanding of the invention may be had by reference to the accompanying schematic drawing which shows an embodiment of the previously described process in detail. All of the lines and equipment are preferably insulated to minimize heat loss.

Referring to the figure in the drawing, free-flow non-catalytic partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alignment with the axis of gas generator 1 is mounted in inlet port 3. Center passage 7 has a flanged up-stream inlet 8 and a converging conical shaped downstream nozzle 9 at the tip of the burner. Burner 6 is also provided with a concentric coaxial annular passage that has an upstream flanged inlet 10 and a downstream conical shaped discharge passage 11. Burners of other design may also be used.

A continuous stream of free-oxygen containing gas i.e. substantially pure oxygen is passed through line 14 into flanged inlet 8 of burner 6.

The oxygen in line 14 and nitrogen in line 15 are produced in a conventional air separation unit 16. Air from line 17 is compressed by compressor 18 and passed through line 19 into air separation unit (ASU) 16. A portion of the steam from line 45 of gas cooler 46 is passed through line 20 of expansion turbine 21 as the working fluid. Spent steam leaves by way of line 22. Shaft 23 of turbine 21 is coupled to and drives compressor 18. A hydrocarbonaceous fuel is introduced into burner 6 by way of lines 24, 25, and inlet 10. Optionally, steam in line 26 may be used to atomize the hydrocarbonaceous fuel.

Refractory lined or insulated flanged "T" connector 30 may be somewhat spherically shaped and is joined by inlet 31 to outlet 4 of gas generator 1. Axially aligned outlet 32 is connected to inlet 33 of insulated slag pot 34. Flanged axial outlet 35 is normally in the closed position by closing valve 40.

The effluent gas stream from gas generator 1 passes through outlet 4. It then enters connector 30 through inlet 31 and leaves through outlet 37 and insulated line 38. Depending on the composition of the hydrocarbonaceous fuel, particulate solids i.e. slag, carbon, metals, or refractory may leave through outlet 4. At least a portion of the solid material may separate from the effluent gas stream in connector 30 and accumulate in the bottom of slag pot 34. Any material in slag pot 34 is periodically removed through line 39, valve 40, line 41 or through a conventional lock-hopper system not shown. The temperature and pressure of the raw gas stream passing through connector 30, outlet 37 and line 38 is substantially unaffected since the lines are insulated and unobstructed.

The hot effluent stream of generator gas in line 38 is introduced into gas cooler 46 by way of inlet 47. The hot gas stream is cooled by passing in indirect heat exchange with boiler feed water which enters gas cooler 46 through line 48 and which leaves as steam through line 45. Optionally, additional heat may be extracted from the gas stream leaving gas cooler 46 through line 49 by means of heat exchanger or economizer 50. For example, the oxygen stream in line 14 may be preheated in economizer 50 prior to being introduced into burner 6.

The cooled gas stream in line 55 is passed into soot scrubber 56 where it is contacted with a counter-flow stream of water e.g. condensate, from line 57. The gas stream leaving soot scrubber 56 is given a final rinse with fresh make-up water from line 58. A dispersion of water and particulate carbon is removed through line 59 and is sent to a conventional carbon recovery zone (not shown). Particulate carbon is recovered in the carbon recovery zone and recycled to the gas generator as a portion of the fuel. Thus, substantially all of the carbon in the fuel is eventually gasified and the efficiency of the process is improved.

The clean gas stream leaving soot scrubber 56 is passed through line 60 into heat exchanger or reboiler 61. The clean gas stream is thereby cooled by indirect heat exchange with liquid absorbent from acid gas stripper 65 located downstream in the process. The liquid absorbent enters reboiler 61 through line 66. After being heated therein, for example to the boiling point, the liquid absorbent leaves through line 67 and is returned to acid gas stripper 65. Optionally, further cooling of the gas stream in line 68 may be effected by passing the gas stream through heat exchanger or cooler 69 in indirect heat exchange with a coolant, such as cold water. By this means the gas stream is cooled below the dew point and water is separated.

The cooled clean stream of synthesis gas in line 70 is then introduced into the lower chamber 71 of HCN absorber 72, where the condensed water is collected. The dewatered gas stream passes up through riser 73 in bottom chimney tray 74. It then passes up through a plurality of trays 75 in upper section 76 of column 72 while in direct contact with the cold aqueous absorbent which enters through line 77 and then passes down through column 72. The gas stream leaving the column may be given a final rinse with cold make-up aqueous absorbent from line 78. Upper section 75 of column 72 comprises a conventional plate column with a plurality of trays 76 for liquid-gas contacting, or alternatively a conventional packed column.

At least a portion of condensate in bottom compartment 71 is pumped by means of pump 80 through lines 81, 82 and 57 into soot scrubber 56. Optionally, a portion of the condensate may be passed through line 83, valve 84, line 85, and introduced into gas generator 1, or discarded from the system. Alternately before recycle to soot scrubber 56, the condensate in line 82 may be degasified, for example in a pressure reduction operation (not shown). The gases released may be sent to flare or to a Claus unit. The HCN-rich aqueous absorbent leaves HCN absorber 72 and is preferably introduced into HCN stripper 88 by way of lines 87, 89, expansion valve 90, and line 91. Stripper 88 is a conventional gas-liquid desorption column with a plurality of plates 92. Aqueous absorbent is optionally, removed through line 93 and pumped by means of pump 94 through line 95 into reboiler 96. After being heated the aqueous absorbent is returned to stripper 88 by way of line 97. Optionally stripping gas in line 100 is passed through line 101 into the bottom of stripper 88. By means of pump 102, the lean aqueous absorbent is pumped through lines 103 to 105, cooled in heat exchanger 106 with cooling water, line 107, cooled in heat exchanger 108 with refrigerant, and line 77 into the upper portion of HCN-absorber 72. Optionally, at least a portion of the rich aqueous absorbent in line 87 may be passed through line 115, valve 116, and line 117 and disposed of in gas generator 1 as a portion of the temperature moderator. In another embodiment, stream 117 is heated to a temperature in the range of about 600° to 700° F. in order to hydrolyze the HCN to ammonia and carbon monoxide before it is mixed with the hydrocarbonaceous fuel and introduced into gas generator 1.

Similarly, if desired a portion of the lean aqueous absorbent in line 104 may be passed through line 118, valve 119, and line 120 and is then disposed of by partial oxidation in gas generator 1 as a portion of the temperature moderator. The overhead stream of gas from HCN stripper 88 in line 121 principally comprises HCN and optionally stripping gas such as nitrogen. There may also be present a small amount i.e. less than 10 volume % of at least one-gas from the group $CO_2$, $H_2S$, and $NH_3$. This gas stream may be sent to flare, or to a Claus Unit, or burned in a furnace.

With valve 123 in line 124 closed, and valve 125 in line 126 open, the clean HCN-free synthesis gas leaves from the top of HCN absorber 72 by way of lines 127, 126, and 128. Should acid gases be present which require removal, then valve 125 is closed, valve 123 is opened, and the HCN-free gas stream in line 127 is passed through lines 124, and 129 into the bottom of acid gas absorption column 135. Acid gas absorber 135 is a conventional gas-liquid absorption column containing a plurality of plates 136. The HCN-free gas stream passing up through the column comes directly into contact with the lean liquid organic absorbent which enters through line 137 and flows down through the column. Purified synthesis gas free from HCN and acid gases leaves through line 138 at the top of acid gas absorber 135.

Rich liquid organic absorbent leaves through line 139 at the bottom of acid gas absorber 135 and is heated in heat exchanger 140 by indirect heat exchange with lean liquid organic absorbent from line 145. Further cooling of the lean liquid organic absorbent in line 146 is effected in heat exchanger 147 by indirect heat exchange with cold water. The heated rich liquid organic absorbent is passed through line 148 and into the upper portion of acid gas stripper 65 where it flows down the column and it is regenerated. Acid gas stripper 65 is a conventional gas-liquid desorption column containing a plurality of plates 149. A stream of partially desorbed liquid organic absorbent material is removed through line 150 near the bottom of column 65 and by means of pump 151 is passed through line 66, and reboiler 61. The heated liquid organic absorbent is introduced into column 65 near the bottom by way of line 67, optional heater 160, and line 161. Optionally, nitrogen stripping gas is passed through lines 100, 152, and is introduced into column 65 near the bottom. The overhead stream of gaseous impurities leaves acid gas stripper 65 through line 153 and is introduced into a Claus unit or sent to flare.

Obviously many modifications and variations of the invention as hereinbefore set forth may be made without departing from the spirit and scope thereof, and only such limitations should be composed as are indicated in the appended claims.

I claim:

1. A process for producing a clean stream of synthesis gas containing substantially no HCN nor sulfur-containing gases comprising:
   (1) reacting a hydrocarbonaceous feed by partial oxidation with a free-oxygen-containing gas with or without a temperature moderator in the reaction zone of a free-flow synthesis gas generator at a temperature in the range of about 1300° F. to 3500° F. and at a pressure in the range of about 10 to 200 atmospheres to produce a stream of synthesis gas comprising $H_2$, CO, $CO_2$, HCN, entrained solids and at least one material from the group $H_2O$, $H_2S$, COS, $CH_4$, $N_2$, $A_r$ and $NH_3$;
   (2) removing at least a portion of said entrained solids and cooling the gas stream to a temperature in the range of about 300° F. to 900° F.;
   (3) cleaning the gas stream from (2) in a gas-scrubbing zone by scrubbing with condensate and make-up water if any so as to remove the remaining entrained solids without removing substantial amounts of HCN and to produce a clean synthesis gas stream containing HCN as an impurity at a temperature in the range of about 212° F. to 600° F. and at a pressure which is substantially the same as that in the synthesis gas generator less ordinary pressure drop in the intervening lines and equipment;
   (4) cooling the gas stream from (3), condensing out and separating water from said clean gas stream, and recycling at least a portion of the condensed water to the gas scrubbing zone in (3) as said condensate;
   (5) introducing the clean gas stream from (4) containing HCN impurity into an HCN-absorption zone and contacting said gas stream therein with an aqueous absorbent comprising about 90 to 100 volume % water in liquid phase at a temperature in the range of about 50° F. to 95° F. and a pressure in the range of about 100 to 1600 psia so as to produce an HCN-rich aqueous absorbent stream;
   (6) removing clean substantially HCN-free synthesis gas from said HCN-absorption zone; and introducing at least a portion of the HCN-rich aqueous absorbent stream from (5) into said gas generator in (1);
   (7) introducing the remainder of said HCN-rich aqueous absorbent stream into an HCN-stripping zone at reduced pressure with or without reboiling and separately removing therefrom a stream of gaseous impurities and a lean aqueous absorbent stream; and introducing said gaseous stream of impurities into the synthesis gas generator in (1) or into a Claus operation or sending same to flare;
   (8) cooling said lean aqueous absorbent from (7) and recycling same to the HCN-absorption zone in (5);
   (9) contacting the clean substantially HCN-free synthesis gas from (6) with lean liquid absorbent in an acid-gas absorption zone and separately removing a stream of rich liquid absorbent and said product gas; and
   (10) heating the stream of rich liquid absorbent from (9) and regenerating same in a regeneration zone wherein at least a portion of said liquid absorbent is heated during regeneration by indirect heat exchange with the clean gas stream leaving the scrubbing zone in (3); cooling the lean liquid absorbent from said regeneration zone and recycling same to said acid-gas absorption zone; and removing from said regeneration zone a stream of acid gas.

2. The process of claim 1 in which the free-oxygen-containing gas is selected from the group consisting of air, oxygen-enriched air (more than 21 mole % $O_2$), and substantially pure oxygen (more than 95 mole % $O_2$).

3. The process of claim 1 in which said hydrocarbonaceous fuel is a liquid hydrocarbon selected from the group consisting of liquefied petroleum gas, petroleum distillates and residues, gasoline, naphtha, kerosene, crude petroleum, asphalt, gas oil, residual oil, tar-sand oil, shale oil, coal derived oil; aromatic hydrocarbons such as benzene, toluene, xylene, and coal tar; cycle-gas oil from fluid-catalytic-cracking operation, furfural extract of coker gas oil; and mixtures thereof.

4. The process of claim 1 in which said hydrocarbonaceous fuel is a mixture of gaseous hydrocarbons.

5. The process of claim 1 in which said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials; and mixtures thereof.

6. The process of claim 1 provided with the step of removing at least a portion of unwanted solid matter from the group particulate carbon, ash, slag, scale, refractory, and mixtures thereof entrained in the gas stream leaving the gas generator or flowing from the gas generator, before introducing said gas stream into said cooling zone in step (2).

7. The process of claim 1 in which said hydrocarbonaceous fuel is a pumpable slurry of solid carbonaceous fuel selected from the group consisting of coal, lignite, particulate carbon, petroleum coke, concentrated sewer sludge, and mixtures thereof, in a liquid carrier such as water, liquid hydrocarbon, and mixtures thereof.

8. The process of claim 1 in which the aqueous absorbent in step (5) is a dilute solution of water containing up to 10 volume % sulfuric acid.

9. The process of claim 1 in which the aqueous absorbent in step (5) is a dilute water solution of the carbonates, bicarbonates, and mixtures thereof of an element or mixture of elements selected from Group IA elements.

10. The process of claim 1 in which said stream of acid gas is introduced into sulfur recovery operation for the production of sulfur.

11. The process of claim 9 with the added steps of removing rich-dilute-absorbent from the HCN absorption zone in step (5), regenerating said absorbent by chemical treatment, and recycling the regenerated absorbent to the HCN absorption zone.

12. The process of claim 1 with the added step of degasifying the condensed water from step (4) before recycling said condensate to the gas scrubbing zone in (3).

13. The process of claim 1 with the added step of introducing a portion of the condensed water from step (4) into the gas generator.

* * * * *